(12) United States Patent  
Altan et al.

(10) Patent No.: US 7,460,951 B2
(45) Date of Patent: Dec. 2, 2008

(54) SYSTEM AND METHOD OF TARGET TRACKING USING SENSOR FUSION

(75) Inventors: Osman D. Altan, Northville, MI (US); Shuqing Zeng, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 467 days.

(21) Appl. No.: 11/235,679

(22) Filed: Sep. 26, 2005

(65) Prior Publication Data

US 2007/0073473 A1  Mar. 29, 2007

(51) Int. Cl.
*G01C 21/26* (2006.01)

(52) U.S. Cl. ...................................... 701/207; 340/903
(58) Field of Classification Search .................. 701/23, 701/24, 27, 200, 213, 214, 93, 98, 300, 301; 340/903, 905, 435, 436; 342/29, 41, 454, 342/455; 382/103, 107, 156, 159, 160, 181; 702/94, 96, 116, 150

See application file for complete search history.

(56) References Cited

U.S. PATENT DOCUMENTS

| | | | |
|---|---|---|---|
| 5,983,161 A | * | 11/1999 | Lemelson et al. ........... 701/301 |
| 6,828,903 B2 | * | 12/2004 | Watanabe et al. ........... 340/435 |
| 6,856,903 B2 | * | 2/2005 | Ishigami et al. ............. 701/213 |
| 6,897,802 B1 | * | 5/2005 | Daniell et al. ................. 342/90 |
| 6,898,585 B2 | * | 5/2005 | Benson et al. ............... 706/52 |
| 7,272,474 B1 | * | 9/2007 | Stentz et al. .................... 701/26 |
| 7,298,868 B2 | * | 11/2007 | Comaniciu ................... 382/107 |

\* cited by examiner

*Primary Examiner*—Dalena Tran

(57) ABSTRACT

A target tracking and sensory fusion system is adapted for use with a vehicle, and configured to observe a condition of at least one object during a cycle. The system includes a plurality of sensors, and a novel controller communicatively coupled to the sensors and configured to more accurately estimate the condition based on sensory fusion. In a preferred embodiment, Kalman filtering is utilized to produce a fused estimate of the object location. The preferred controller is further configured to match each new sensory observation with a track in a track list, and remove the track from the track list, when a matching observation is not determined, during a subsequent cycle.

16 Claims, 3 Drawing Sheets

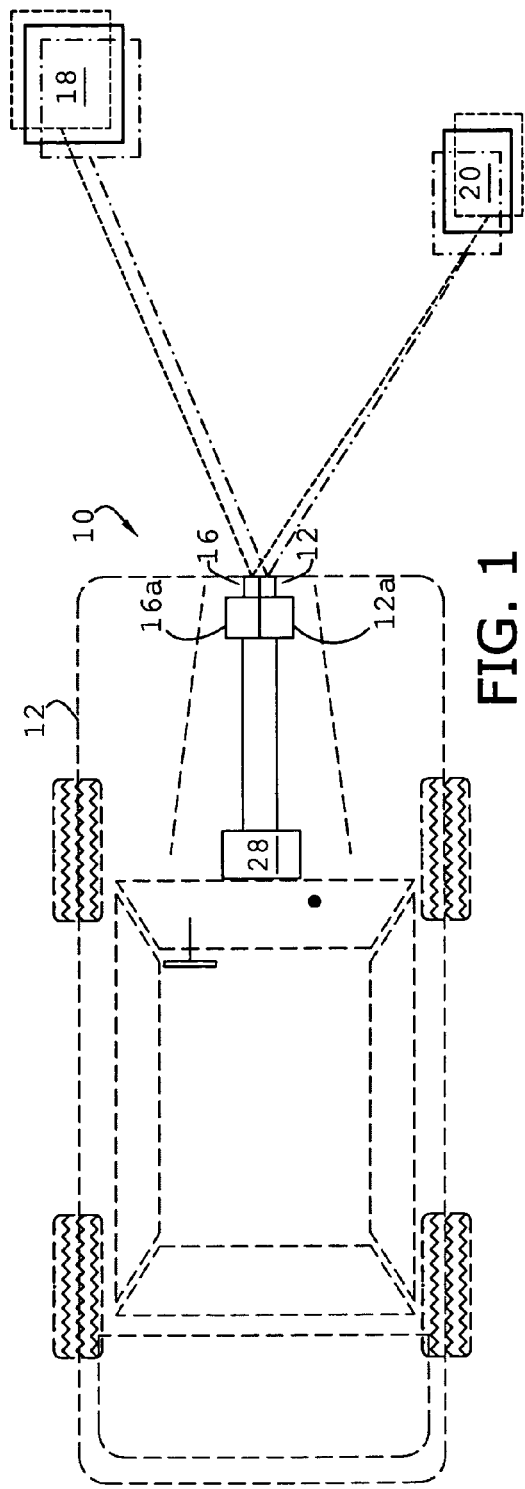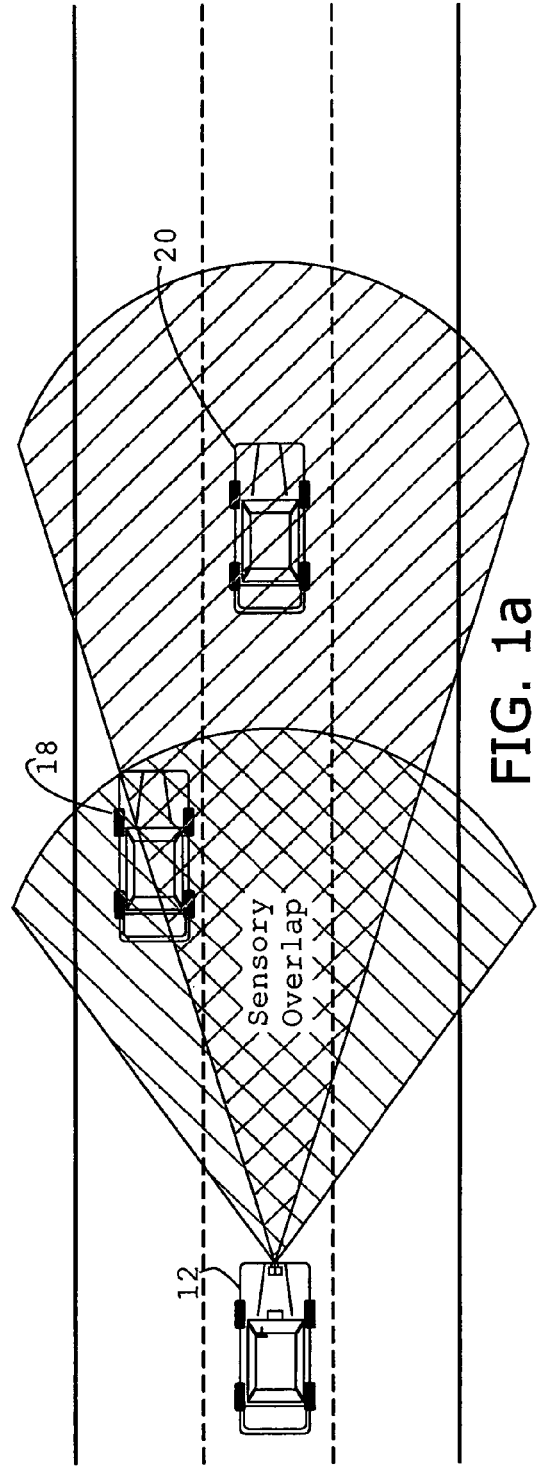

SYSTEM AND METHOD OF TARGET TRACKING USING SENSOR FUSION

BACKGROUND OF THE INVENTION

1. Field of the Invention

The present invention relates to object tracking systems, and more particularly, to a multi-sensor system and method of fusing data from a plurality of sensors, for more accurately estimating the location of a given object.

2. Discussion of Prior Art

Object tracking and target profiling systems have been developed as part of safety applications in various industries, including the aviation and automotive industries. These systems utilize periodic or continuous detection of objects and control algorithms to estimate various planar parameters of an object, such as the relative object range, range rate (i.e., closing or opening velocity), and azimuth position (i.e., bearing), as well as three-dimensional parameters where applicable, such as altitude or elevation, so as to avoid, follow, or otherwise survey the object. It is apparent that the ability of these systems to provide accurate estimations is crucial to achieving the desired benefits of their applications.

Inaccurate assessments or missed detections, for example, can lead to false positives, collisions, and other system failures. In addition to physical malfunctions, however, it is appreciated by those ordinarily skilled in the art that the standard deviation of measurement for a particular sensor, plus background interference (typically modeled as white Gaussian noise) also provide a degree of inaccuracy inherent to all sensory performance systems. The imprecision of these systems in determining the exact location of the object present further concerns where utilized with intricate or crucial applications.

To improve the likelihood of object detection, a plurality of sensors is often utilized within a system. With respect to automotive applications, such as collision detection or lateral support systems, for example, these sensors may include GPS, FM-CW radars, pulse and FSK radars, and CCD's, CMOS, or other camera/video image processors. Irrespective of application, however, these multiple-observer configurations generally operate to detect the same object, so as to provide back-up or redundant means of detection, and therefore, do not typically improve the overall accuracy of the system above that of the most accurate sensor. Multi-observer systems that have been developed to increase accuracy, such as phased-array-multi-beam-radar systems, typically require complex construction and expensive equipment to operate.

Finally, where multiple-observer configurations are utilized, multiple sets of data are generated for each detected object and statically stored as tracks. Due to the multiplication of data, the tracks may become voluminous over time, thereby requiring expensive and cumbersome data storage and manipulation. The inability of these systems to remove inactive and otherwise useless tracks from the system, further results in wasted resources and possible confusion by the system, application, or user.

BRIEF SUMMARY OF THE INVENTION

Responsive to these and other concerns, an improved target tracking system and method utilizing a plurality of sensors and data fusion is presented for increasing the precision and certainty of system measurements above that of any single system sensor. Among other things, the present invention is useful for expanding coverage by merging field-of-view, reducing the capture/recapture time of objects, decreasing the likelihood of producing false positives and false negatives, and increasing the range of feasible applications for which conventional sensors can be utilized.

A first aspect of the present invention concerns a target tracking and sensor fusion system for estimating a condition of at least one object. The system includes a first sensor configured to determine a first estimate of a condition of the object, and a second sensor configured to determine a second estimate of the condition. The system further includes a controller communicatively coupled to the sensors, and configured to determine a third estimate of the condition. The third estimate is based in part on the first and second estimates, and each of the first and second estimates includes a measured value and a standard of deviation. Finally, the third estimate presents a calculated value and a standard of deviation less than each of the first and second standards of deviation.

A second aspect of the present invention concerns a computer program for execution by at least one electronic device associated with a plurality of sensors, wherein each of the sensors are configured to estimate at least one condition of at least one object. The program is configured to receive initial estimate data of said at least one condition from the sensors, and apply a sensory fusion algorithm to the initial estimate data, so as to determine a state estimate for said at least one condition. The state estimate presents a higher probability and smaller standard of deviation than the initial estimate data.

In one embodiment of this invention, the sensor fusion algorithm is applied to a land vehicle having a plurality of like or dissimilar sensors to increase the robustness of object detection. In this configuration, applications, such as full speed automatic cruise control (ACC), auto braking, and pre-crash systems, can be enhanced. Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein:

FIG. 1 is a plan view of a vehicle in accordance with a preferred embodiment of the present invention, particularly illustrating components of a preferred target tracking and sensory fusion system;

FIG. 1a is a plan view of a vehicle in accordance with a preferred embodiment of the present invention, wherein the vehicle travels upon a thoroughfare and uses multiple sensors to track two traveling remote vehicles;

MODES FOR CARRYING OUT THE INVENTION

The present invention concerns an improved target tracking and sensory fusion system 10. In the preferred embodiments of the present invention described and illustrated herein, the system 10 is adapted for use with a vehicle 12 having a plurality of sensors configured to detect the location of and track at least one object. Broadly, the system 10 utilizes an algorithm to receive condition data from the sensors and determine a more precise and accurate estimation of the condition. For illustrative purposes, the system 10 is shown in FIGS. 1 and 1a having a plurality of two sensors 14,16, and tracking two objects (i.e. targets) 18,20. It is certainly within the ambit of the present invention, however, to use the novel aspects and features of the invention with other environments where more precise target tracking is desired. For example, the present invention may be utilized in air traffic control, nautical navigation, and weapons guidance systems.

In a preferred embodiment of the invention further described herein, the algorithm utilizes a fusion method based on Kalman filtering (KF). It is appreciated by those ordinarily skilled in the art that a KF application is used to explore correlative characteristics of each target 18,20 along a temporal axis. In other words, it is assumed that the tracked target moves smoothly over a period of time. The system 10 is further configured to capture the spatial correlation (i.e., the relative position of each object as observed by multiple sensors).

Figure 2:
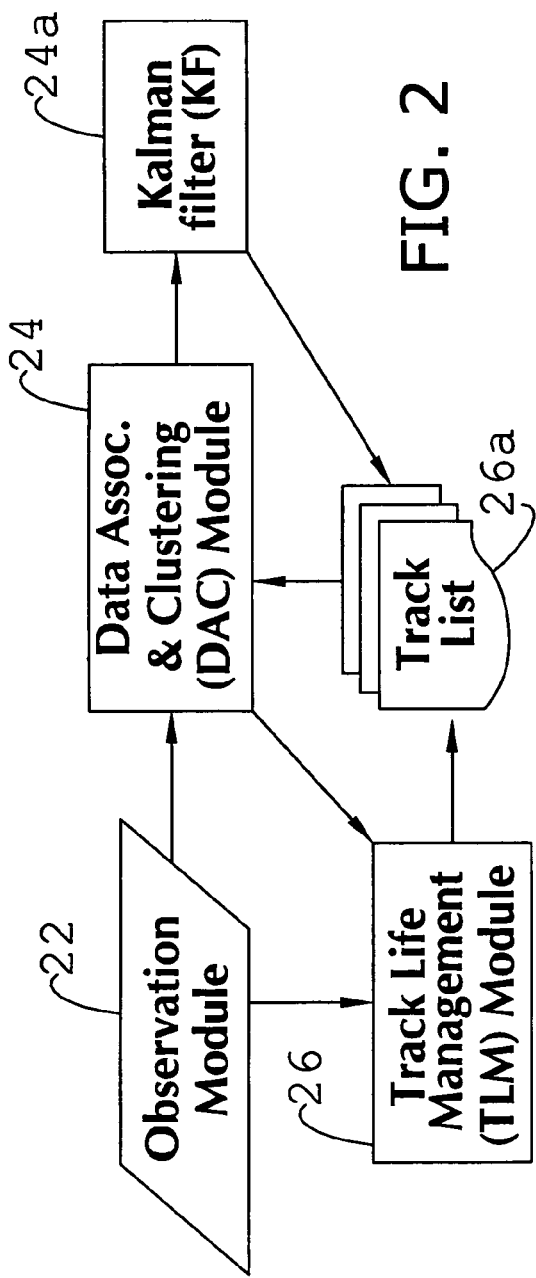
FIG. 2 is a block diagram of a preferred embodiment of the system, particularly illustrating the interrelation between the observation, data association and clustering, and track life management modules.

Turning to FIG. 2, a preferred embodiment of the system 10 generally includes an observation module 22, a data association and clustering (DAC) module 24 that further includes a Kalman filter 24a, and a track life management (TLM) module 26 that keeps track of a track list 26a comprising of a plurality of object tracks. More particularly, the observation module consists of sensors, their respective sensor processors, and the interconnection between the sensors, sensor processors, and the DAC module. With respect to land vehicles, it is appreciated that these sensors may include GPS systems, charged-coupled device (CCD) or complementary metal oxide semi-conductor (CMOS) video image sensors, long and medium range radar and lidar sensors, and ultrasonic sensors. These sensors are preferably positioned within the vehicle in relatively unobstructed positions.

It is also appreciated by those ordinarily skilled in the art that none of these sensors are perfect in performing their intended functions, but instead only provide an estimate of the actual location or condition, wherein said estimate presents an estimated value and a standard of deviation. As such, sensory detection and measurement of object locations and conditions shall be referred to herein as "estimates."

It is further appreciated that the characteristics of these sensors are complementary, in that some are more reliable in estimating certain parameters than others. Conventional sensors have different operating ranges and angular coverages, and are capable of estimating different parameters within their operating range (see FIG. 1a). For example, radar sensors can usually estimate range, range rate and azimuth location of an object, but is not normally robust in estimating the extent of a detected object. A camera with vision processor is more robust in estimating the shape and azimuth position of the object, but is less efficient at estimating the range and range rate of the object. Scanning type Lidars perform efficiently and accurately with respect to estimating range, and azimuth position, but cannot estimate range rate, and is therefore not accurate with respect to new object acquisition/recognition. Ultrasonic sensors are capable of estimating range but are generally incapable of estimating or computing range rate and azimuth position. Further, it is appreciated that the performance of each sensor technology is impacted by differing environmental conditions. Thus, conventional sensors present parametric variances, but more importantly, the operative overlap of these sensors (see, FIG. 1a) creates opportunities for sensory fusion.

Figure 3:
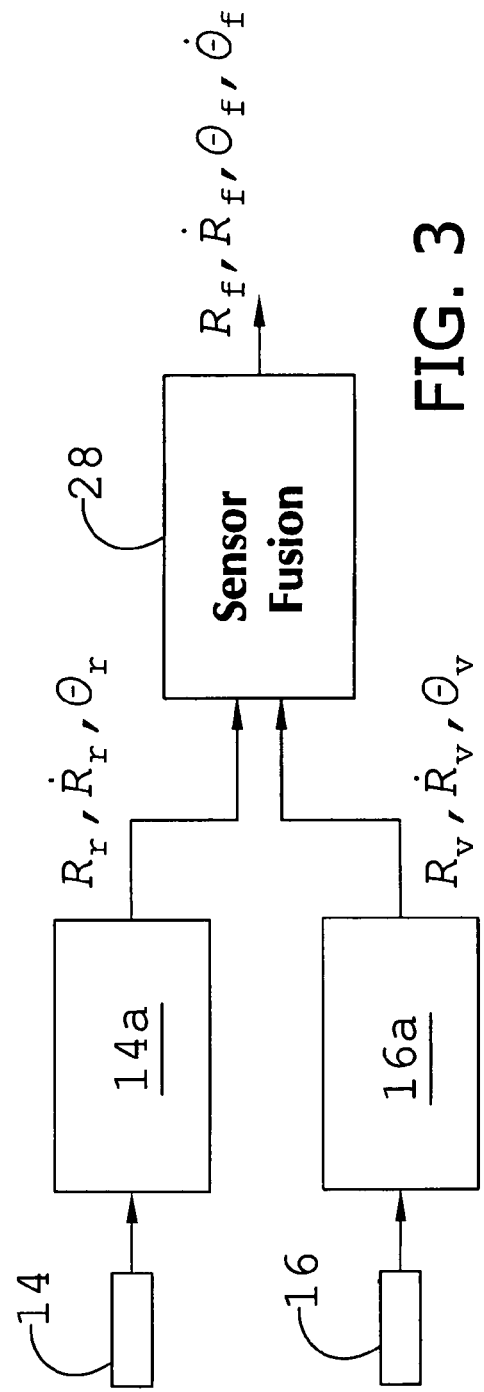
FIG. 3 is a block diagram of a preferred embodiment of the sensory fusion process, including radar and vision sensors.

As shown in FIG. 3, the illustrated observation module 22 includes a radar sensor 14, a radar processor 14a, a camera 16, and a vision processor 16a. The radar processor 14a converts signals received from the radar 14 to determine range ($R_R$), range rate ($\dot{R}_R$), and azimuth angle ($1_R$) estimates for each of the objects 18,20. Similarly, the vision processor 16a converts signals received from the camera 16 to also determine a second set of range ($R_V$), range rate ($\dot{R}_V$), and azimuth angle ($1_V$) estimates for the objects 18,20.

The preferred DAC module 24 includes a controller 28, wherein a computer program (not shown) is stored and configured to receive the estimate data from each of the plurality of sensors, to cluster the data into like observation tracks (i.e. observations of the same object by multiple sensors), and to fuse the clustered observations to determine a true track status. Ideally, fusing data of sensors from different technologies yield more robust results. Again, it is appreciated that any number of sensors can be used in this technique, and that the more sensors fused the more robust the results. However, it is also appreciated that an increased number of sensors results in increased algorithm complexity, and the requirement of more computing power to produce results within the same time frame. The preferred controller 28 is housed within the host vehicle 12, but may also be located at a remote location. In this regard, the preferred controller 28 is electrically coupled to the sensor processors 14a,16a, but may also be wirelessly coupled through RF, LAN, Infrared or other conventional wireless technology.

Finally, the preferred TLM module 26 is configured to then receive the fused data of liked observations, and store the fused observations in a list of tracks 26a. The TLM module 26 is further configured to distinguish tracks according to their immanence. More preferably, the TLM module is configured to assign to each track a strength value, and to add to or subtract from the initial strength a predetermined value or at a predetermined rate each cycle depending upon whether a like observation was made during the cycle.

A preferred embodiment of the inventive algorithms and function of the controller 28 to accomplish these tasks is more particularly described as follows:

I. Observation Module

As previously mentioned, a block diagram of an exemplary system is shown in FIG. 3, where two sensory systems, (i) radar with radar processor, and (ii) camera with vision processor, capture and transmit to the sensor fusion controller 28 observation estimates. The radar processor generates three parameters, range ($R_R$), range rate ($\dot{R}_R$), and azimuth angle ($1_R$). A number of these parameters are generated each cycle time depending on the number of objects with sufficient 'radar cross section' in the field-of-view of the radar. These objects are represented in the form ($R_{Ri}, \dot{R}_{Ri}, \Theta_{Ri}$), where i=1, 2, . . . , p, and p denotes the number of detected objects from the radar processor.

Similarly, the vision processor generates observation: range ($R_V$), range rate ($\dot{R}_V$), and azimuth angle ($1_V$) in each time frame based on 'template matching' and relative offsets from the horizon line in the image plane, which are represented by ($R_{Vj}, \dot{R}_{Vj}, 1_{Vj}$) where j=1, 2, . . . , q and q denotes the number of detected objects from the vision processor.

II. DAC Module and Sensory Fusion

The preferred controller 28 is configured to apply a sensor fusion algorithm to the observation estimates, and uses these inputs to generate a more accurate fused track, wherein the term "more accurate" is defined by a more probable estimated location and a reduced standard of deviation (i.e. a taller and narrower statistical bell-curve). In FIG. 3, four parameters are generated by the controller 28: a fused range (r), range rate (ṙ), azimuth angle (θ) and azimuth angle rate (θ̇) represented by ($r_k, \dot{r}_k, \theta_k, \dot{\theta}_k$), wherein k=1, 2 . . . , r, and r denotes the number of fused tracks. Thus, at least with respect to the azimuth angle rate, the preferred controller 28 is further configured to store data over a period and utilize multiple data entries of a first condition to determine a second condition estimate. In a preferred embodiment, the fusion algorithm may be implemented in a real-time system having suitable hardware and interface configuration.

For a plurality of objects, as shown in FIG. 1, the system 10 produces a plurality of tracks. A state vector (Y(t)) represents the status of the tracks and is presented as follows:

$$Y(t)=[y_1(t)^T y_2(t)^T \ldots y_r(t)^T]^T \quad (1),$$

where the index t denotes a discrete time, r denotes the number of tracks, and the k-th component $y_k(t)$ is the state of the k-th track in polar coordinates as follows:

$$y_k(t)=[r_k(t)\dot{r}_k(t)\theta_k(t)\dot{\theta}_k(t)]^T \quad (2).$$

For computational simplicity, it is assumed that the tracks are statistically independent of each other. This assumption allows each track to be modeled separately. Equations for the evolution of a track ($y_k$) are preferably determined by assuming constant values for both the range rate ($\dot{r}_k$) and azimuth angle rate ($\dot{\theta}_k$) during a sample interval Δt, such that:

$$y_k(t+1)=Fy_k(t)+v_k \quad (3),$$

where $$F = \begin{bmatrix} 1 & \Delta t & & \\ & 1 & & \\ & & 1 & \Delta t \\ & & & 1 \end{bmatrix},$$

and $v_k$ is a 4-by-1 white Guassian noise vector with $v_k \sim N(0, Q)$ and Q is the covariance matrix. Thus, a future track state $y_k(t+1)$ based on a previously determined track state $y_k(t)$ is determinable, where no intervening observation is made.

In order to capture the dynamic behavior of a cut-in, departure, or maneuver-changing scenario (e.g., unexpected deceleration), however, the preferred controller 28 is further configured to compare a subsequent observation with each track, so as to determine a track match. In a KF embodiment, each observation is assigned to a track based on a metrics. In the illustrated embodiment, and at discrete time t the radar and vision processors generate observations $O_{Ri}=\{(\dot{R}_{Ri},\Theta_{Ri},R_{Ri})|i=1,\ldots,p\}$, and $O_{Vj}=\{(R_{Vj},R_{Vj},\Theta_{Vj})|j=1,\ldots,q\}$ respectively.

Given an observation $O_{Ri}$ or $O_{Vj}$, the polar coordinates or range rate can be compared to a corresponding component of a given track, in accordance with the following difference parameters:

$$\Delta R_{k,i}=r_k-R_i \text{ for } k=1,\ldots,r, \text{ and } i=1,\ldots,p+q$$

$$\Delta \dot{R}_{k,i}=\dot{r}_k-\dot{R}_i \text{ for } k=1,\ldots,r, \text{ and } i=1,\ldots,p+q, \text{ and}$$

$$\Delta \Theta_{k,i}=\theta_k-\Theta_i \text{ for } k=1,\ldots,r, \text{ and } i=1,\ldots,p+q.$$

Each of the difference parameters is passed through a function empirically derived from the characteristics of the radar and vision sensing systems, and designated as $f_R(\Delta R)$, $f_{\dot{R}}(\Delta \dot{R})$, and $f_\Theta(\Delta \Theta)$, respectively.

The parameters are then combined to determine a merit quantity $L_{k,i}$, wherein:

$$L_{k,i}=k_R f_R(\Delta R_{k,i})+k_{\dot{R}} f_{\dot{R}}(\Delta \dot{R}_{k,i})+k_\Theta f_\Theta(\Delta \Theta_{k,i}) \quad (4).$$

The quantity $L_{k,i}$ indicates the merit that $O_i$ matches the k-th track. The three functions $f_R(\Delta R)$, $f_{\dot{R}}(\Delta \dot{R})$, and $f_\Theta(\Delta \Theta)$ define windows that depend on the accuracy of the radar and vision sensors 14,16 in estimating the corresponding parameters. The constants $k_R$, $k_{\dot{R}}$, and $k_\Theta$ define the weights of parameters used in decision making and are based on the robustness of individual sensor parameters.

A merit function value ($L_i$) of an observation $O_i$, equal to $$L_i = \max_{k=1,\ldots,r} L_{k,i},$$

is then compared to a threshold T. Where $L_i \geq T$, $O_i$ is declared a match, and is assigned to the K-th track with maximum merit. That is to say $L_{K,i} \geq L_{k,i}$, for all k=1, . . . , r. The functions $f_R(\Delta R)$, $f_{\dot{R}}(\Delta \dot{R})$ and $f_\Theta(\Delta \Theta)$ may be designed using various techniques, including a likelihood function (e.g. fuzzy logic) methodology. However, a symmetric kernel function (K(•)) is preferred in the illustrated embodiment. For example, the following formula may be utilized:

$$f_R(\Delta R) = K\left(\frac{\Delta R}{h_R}\right), \quad (5)$$

where $h_R$ denotes a scaling factor reflective of sensor characteristics. More particularly, two typical kernel functions may be used:

i) Gaussian kernel:

$$K(u)=\exp(-u^2)$$

ii) Quadratic kernel:

$$K(u) = \begin{cases} (1-d^2) & \text{if } |d| < 1, \\ 0 & \text{otherwise.} \end{cases}$$

All observations determined to match a given track y(t) at discrete time t are denoted by $O_i$, i=1, . . . , s where s is the number observation associated with the track. Again, it is assumed that each observation is statistically independent, and can therefore be considered separately. More preferably, where there is a match, $O_i$ is modeled by the following formula:

$$O_i(t)=Gy(t)+w_i \quad (6),$$

where $$G = \begin{bmatrix} 1 & & & \\ & 1 & & \\ & & 1 & 0 \end{bmatrix},$$

$w_i$ is a 3-by-1 white Guassian observer noise vector with $w_i \sim N(0,R_i)$ and the covariance matrix ($R_i$) is derived from the accuracy specification of the observing sensor.

Thus, the new track status can be estimated from the following KF equations:

$$y(t+1) = \hat{y}(t+1|t) + \sum_{i=1}^{s} K_i(O_i - G\hat{y}(t+1|t)), \quad (7)$$

$$P(t+1) = \left(I - \sum_{i=1}^{s} K_i G\right)\hat{P}(t+1|t), \quad (8)$$

where, $\hat{y}(t+1|t)=Fy(t)$, $$\hat{P}(t+1|t)=FP(T)F^T+Q \quad (9),$$

and the KF gain for the i-th observer ($K_i$) is $$K_i = \hat{P}(t+1|t)G^T(R_i+G\hat{P}(t+1|t)G^T)^{-1} \quad (10).$$

The P(t+1) matrix is the first-order covariance matrix of y(t+1), and represents the confidence level (i.e. the level of variance from the mean) of the estimate y(t+1). It is appreciated that P(t) is recursively calculated based on formulas (8) and (9). The initial values of y(0) and P(0) are determined using sensory input at a time frame 0. That is to say, whenever a new track is introduced, the unmatched sensor observation is used for y(0) and a heuristically defined constant is used for P(0).

III. TLM Module

Once the track list ({$y_1, y_2, \ldots, y_r$}) 26a is compiled, the preferred system 10 is further configured to monitor the life of each track. That is to say, the system 10 is configured to initiate a new track upon an observation that has not been associated to any of the existing tracks, and is able to determine whether an existing track should be withdrawn from the list 26a. Where it is appreciated in active safety applications that objects appear or leave the field-of-view (FOV) of sensors frequently, the TLM module 26 facilitates the retention of an accurate state vector Y(t).

Figure 4:
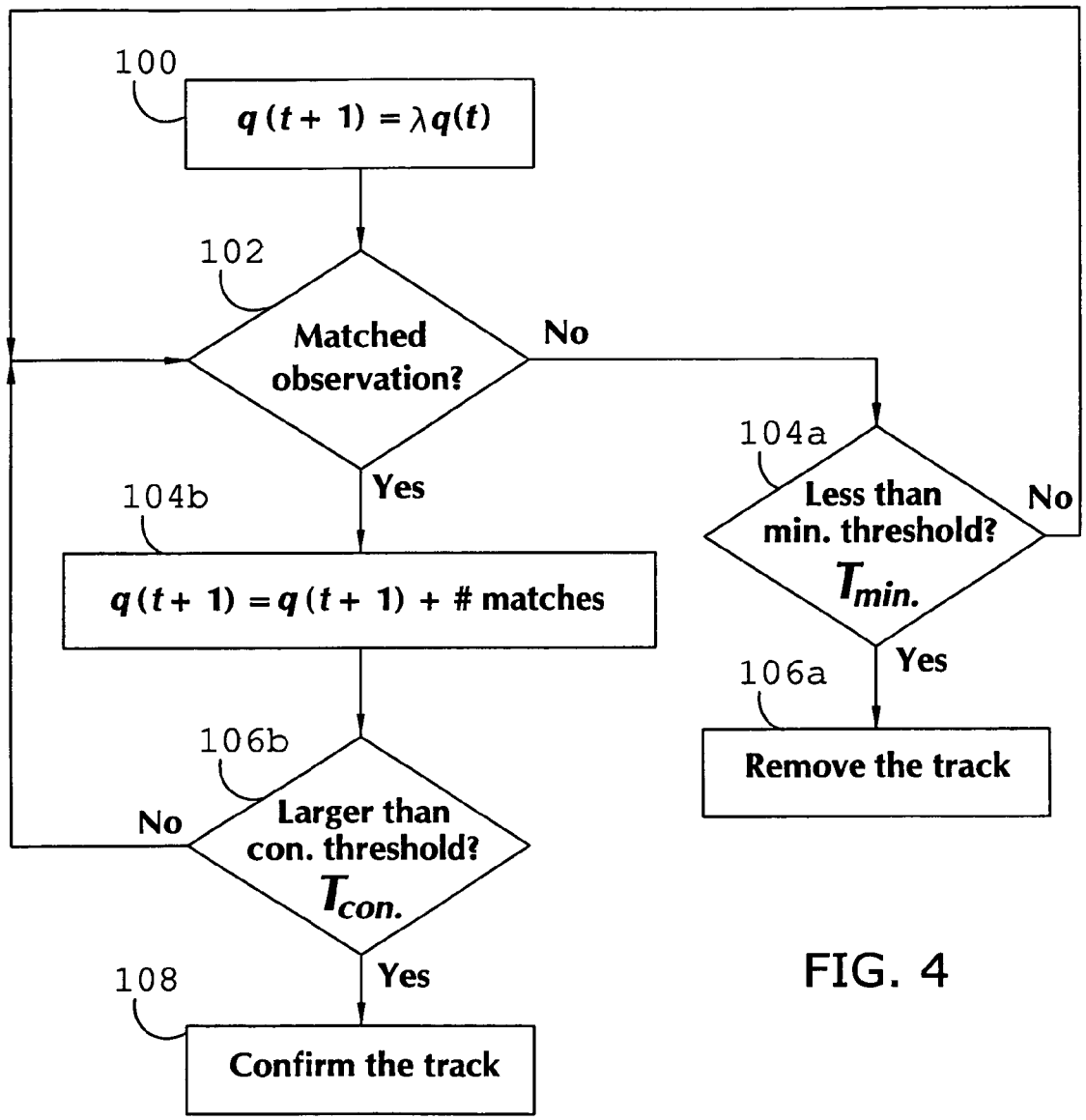
FIG. 4 is a flow chart of a preferred embodiment of the control algorithm with respect to track life management.

In the illustrated embodiment, a quantity $q_k(t)$ is attributed to each track $y_k$ to denote its strength. As shown in FIG. 4, a preferred method of track life management, begins at a step 100, where the value $q_k(t)$ decays at a rate ($\lambda$), and more preferably, at an exponential rate. The values $q_k(t)$ and $\lambda$ may be constant with respect to each track or may vary depending upon track characteristics. For example, tracks comprising of relatively peripheral object observations may be attributed a lesser strength or faster decay rate. After a completed communication cycle, and at a step 102, all observations are compared to track parameters (pursuant to part II) to determine at least one matched observation.

At alternative steps 104a and b, the new value q(t+1) is either compared to a minimum threshold $T_{min}$ if a matched observation was not determined (104a), or increased by a predetermined value for each observation if a matched observation was determined (104b). Where no matched observation was determined, and the depleted new value is less than $T_{min}$, the track is removed from the list at a step 106a, otherwise the method returns to step 102. If at least one matched observation was determined, the increased new value q(t+1) is compared to a confirmation threshold $T_{con}$, at a step 106b. If q(t+1) is greater than $T_{con}$, then the track is confirmed at a step 108, otherwise the method returns to step 102. More preferably, at step 104b the increase to q(t+1) is limited by q(t), so as to result in simultaneous departure notifications irrespective of the plurality of matched observations.

The preferred forms of the invention described above are to be used as illustration only, and should not be utilized in a limiting sense in interpreting the scope of the present invention. Obvious modifications to the exemplary embodiments and methods of operation, as set forth herein, could be readily made by those skilled in the art without departing from the spirit of the present invention. The inventors hereby state their intent to rely on the Doctrine of Equivalents to determine and assess the reasonably fair scope of the present invention as pertains to any system or method not materially departing from but outside the literal scope of the invention as set forth in the following claims.

What is claimed is:

1. A computer program for execution by at least one electronic device associated with a plurality of sensors, wherein each of said sensors are configured to estimate at least one condition of at least one object, said program is configured to receive initial estimate data of said at least one condition from the sensors and apply a sensory fusion algorithm to the initial estimate data, so as to determine a state estimate for said at least one condition, said state estimate presents a higher probability and smaller standard of deviation than the initial estimate data, initial and state estimates are determined for a plurality of conditions, said state estimates are stored in a track ($y_k(t)$), the plurality of conditions include at least one rate condition, each of said tracks is dynamically modeled at a time increment (t+1) by applying to $y_k(t)$ a vector multiplier (F) that assumes a constant rate condition, and adding a white Guassian noise vector ($v_k$), initial and state estimates are determined for a plurality of conditions including object range (r), range rate ($\dot{r}$), azimuth angle ($\theta$) and azimuth angle rate ($\dot{\theta}$), and the modeled track ($y_k(t+1)$) is determined according to the formula:

$$y_k(t+1)=Fy_k(t)+v_k, \text{ where}$$

$$F = \begin{bmatrix} 1 & \Delta t & & \\ & 1 & & \\ & & 1 & \Delta t \\ & & & 1 \end{bmatrix}.$$

2. A computer program for execution by at least one electronic device associated with a plurality of sensors, wherein each of said sensors are configured to estimate at least one condition of at least one object, said program is configured to receive initial estimate data of said at least one condition from the sensors and apply a sensory fusion algorithm to the initial estimate data, so as to determine a state estimate for said at least one condition, said state estimate presents a higher probability and smaller standard of deviation than the initial estimate data, initial and state estimates are determined for a plurality of conditions, said state estimates are stored in a track ($y_k(t)$), state estimates are determined for at least one new object, and compared to $y_k(t)$ to determine a difference parameter for each of said conditions, each of said difference parameters being passed through a function based on the characteristics of the sensor, further multiplied by a constant coefficient based on the robustness of individual sensor measurements, and then combined to determine a merit value ($L_{k,i}$), and said state estimates of said at least one new object is assigned to $y_k(t)$ where $L_{k,i}$ is not less than a pre-determined threshold.

3. The program as claimed in claim 2,
said function being a fuzzy logic membership function.

4. The program as claimed in claim 2,
said function being a symmetric kernel function.

5. The program as claimed in claim 4,
said function being $$f_R(\Delta R) = K\left(\frac{\Delta R}{h_R}\right),$$

where $h_R$ denotes a scaling factor based on the characteristics of the sensor.

6. The program as claimed in claim 5,
said function being a Gaussian Kernel function.

7. The program as claimed in claim 6,
said function being:

$$K(u)=\exp(-u^2).$$

8. The program as claimed in claim 5,
said function being a quadratic Kernel function.

9. The program as claimed in claim 8,
said function being $$K(u) = \begin{cases} (1-d^2) & \text{if } |d| < 1, \\ 0 & \text{otherwise.} \end{cases}$$

10. The program as claimed in claim 2, wherein a plurality of observations ($O_i(t)$) are assigned to $y_k(t)$, and each of said observations are defined by the formula:

$$O_i(t)=Gy(t)+w_i,$$

where $$G = \begin{bmatrix} 1 & & \\ & 1 & \\ & & 1 & 0 \end{bmatrix},$$

$w_i$ is a 3-by-1 white Gaussian noise vector derived in part from the accuracy of the sensor system, and the observations are combined to determine a true track status.

11. The program as claimed in claim 10, wherein the observations are combined using Kalman filtering to determine the true track status.

12. The program as claimed in claim 11, wherein the true track status is determined in accordance with the formula(s):

$$y(t+1) = \hat{y}(t+1|t) + \sum_{i=1}^{s} K_i(O_i - G\hat{y}(t+1|t))$$

where $\hat{y}(t+1|t) = Fy(t)$.

13. The program as claimed in claim 12, wherein the true track status is further determined in accordance with the covariance formula(s):

$$P(t+1) = \left(I - \sum_{i=1}^{s} K_i G\right)\hat{P}(t+1|t),$$

where $\hat{P}(t+1|t) = FP(t)F^T + Q$.

14. The program as claimed in claim 12, wherein the KF gain for the i-th observer ($K_i$) is determined in accordance with the following formula:

$$K_i=\hat{P}(t+1|t)G^T(R_i+G\hat{P}(t+1|t)G^T)^{-1}.$$

15. The program as claimed in claim 2,
each of said tracks $y_k(t)$ being assigned a track strength ($q_k(t)$), wherein $q_k(t)=1$ upon the assignment of an observation to the track, and decays at a rate ($\lambda$) over a subsequent period, if no observations are assigned to the track over the period, and the track $y_k(t)$ is removed from $Y(t)$, if $q_k(t)$ falls below a pre-determined minimum threshold.

16. The program as claimed in claim 15, wherein a first portion of the tracks decays at a different rate than a second portion of the tracks.

* * * * *